United States Patent
Dunkerley et al.

(10) Patent No.: US 11,996,681 B2
(45) Date of Patent: May 28, 2024

(54) METHOD OF MANUFACTURING A TERMINATION BAND

(71) Applicant: HellermannTyton Limited, Manchester (GB)

(72) Inventors: Andy Dunkerley, Plympton (GB); Jack Fearnley, Manchester (GB)

(73) Assignee: HellermannTyton Limited, Manchester (GB)

(*) Notice: Subject to any disclaimer, the term of this patent is extended or adjusted under 35 U.S.C. 154(b) by 853 days.

(21) Appl. No.: 17/018,792

(22) Filed: Sep. 11, 2020

(65) Prior Publication Data

US 2021/0083466 A1 Mar. 18, 2021

(30) Foreign Application Priority Data

Sep. 12, 2019 (GB) ..................... 1913139

(51) Int. Cl.
*B23K 26/21* (2014.01)
*H02G 15/02* (2006.01)
*B23K 101/38* (2006.01)

(52) U.S. Cl.
CPC ............ *H02G 15/02* (2013.01); *B23K 26/21* (2015.10); *B23K 2101/38* (2018.08)

(58) Field of Classification Search
CPC .... B23K 26/21; B23K 2101/38; B65D 63/06; Y10T 29/49117
See application file for complete search history.

(56) References Cited

U.S. PATENT DOCUMENTS

| 1,084,407 A | * | 1/1914 | Deist | A01K 35/00 24/20 EE |
|---|---|---|---|---|
| 2,881,915 A | | 4/1959 | Koehler et al. | |

(Continued)

FOREIGN PATENT DOCUMENTS

| CN | 2813495 | 9/2006 |
|---|---|---|
| CN | 102464144 | 5/2012 |

(Continued)

OTHER PUBLICATIONS

"Foreign Office Action", CN Application No. 202010961650.8, dated Oct. 10, 2022, 16 pages.

(Continued)

*Primary Examiner* — Donghai D Nguyen
(74) *Attorney, Agent, or Firm* — Colby Nipper PLLC

(57) ABSTRACT

The present disclosure provides a termination band and a method of manufacturing the termination band, which includes a strap and a head. When secured, the head comprises an upper wall, lower wall and opposed side walls formed as a loop with the strap extending therefrom. The termination band is therefore formed as a two-piece component, rather than a single piece as in the prior art. Advantageously this enables the strap and the head to be formed from stainless steel strip having the same width as the head and the strap. It is therefore not necessary to trim the material of either part, hence there is significantly reduced material wastage when forming the termination band. In addition, because the strap and head are both initially in the form of straight-sided elongate strips prior to the folding or joining operations, both parts may be easily edge finished and/or surface finished.

13 Claims, 5 Drawing Sheets

(56) References Cited

U.S. PATENT DOCUMENTS

| | | | |
|---|---|---|---|
| 4,646,393 A | 3/1987 | Young | |
| 4,751,769 A | 6/1988 | Young | |
| 8,146,212 B2* | 4/2012 | Nelson | B65D 63/06 |
| | | | 24/703.1 |
| 2015/0104976 A1 | 4/2015 | Myong | |

FOREIGN PATENT DOCUMENTS

| | | |
|---|---|---|
| CN | 205602394 | 9/2016 |
| CN | 108910287 | 11/2018 |
| CN | 109051313 | 12/2018 |
| CN | 110053874 | 7/2019 |
| TW | 201139911 | 11/2011 |

OTHER PUBLICATIONS

"Foreign Office Action", CN Application No. 202010961650.8, dated Mar. 3, 2022, 17 pages.

"Search Report", GB Application No. 1913139.0, dated Feb. 28, 2020, 3 pages.

"Extended European Search Report", EP Application No. 20195365.0, dated Feb. 21, 2021, 9 pages.

\* cited by examiner

--PRIOR ART--

METHOD OF MANUFACTURING A TERMINATION BAND

CROSS-REFERENCE TO RELATED APPLICATION

This application claims priority to UK Patent Application Number 1913139.0, filed Sep. 12, 2019, the disclosure of which is hereby incorporated by reference in its entirety herein.

TECHNICAL FIELD

The present disclosure relates to a method of manufacturing a termination band and in particular a method of manufacturing a termination band as a two-piece component.

BACKGROUND

Cable shielding is used to combat the effects of Electromagnetic Interference (EMI) and Radio Frequency Interference (RFI). A cable shield or braid is provided around the cable to provide EMI and/or RFI shielding. Where a cable connects to an electrical connector the shield must terminate. However, it is important that the shield is properly secured to the connector to ensure the cable is fully shielded and that there is no gap exposure between the termination of the shield and the connector. Typically, the connector will include a backshell over which the shield is extended, while the electrical cable extends within the backshell. A termination band is a connection strap that is commonly used to attach the shield to the backstop of the electrical connector. The termination band is secured around the shield and the backshell in the region the two overlap and tightened to secure and clamp the shield to the backshell.

During installation, the shield is slid into position over the termination section of the backshell platform. The termination band is then slid along the shield until it is aligned with the termination section of the backshell. The termination band includes a strap and a head section or 'buckle'. The strap extends through the buckle to form a loop. Depending on length of the strap, a single or double loop may be formed. A band tightening tool is used to tension the band. Once the appropriate tension is achieved a right-angle bend is formed in the strap at point it leaves the buckle and the strap is cut to length leaving a short tab remaining. The tab is folded back over the buckle, which secures the strap in place.

Termination bands are formed using a press tool to press the strap as a single piece blank from a strip of stainless steel. As shown in FIG. 1, the strap blank 1 is pressed from a steel strip 2. The strap blank 1 is substantially T-shaped, having a strap section 4 and head section 6. The head section 6 includes wings 8 that extend laterally outwardly of the side edges of the strap section 4.

Following the first press operation the head 6 is formed in a bending operation in which the wings 8 are folded upwardly and inwardly until the free ends 9 meet. The free ends 14 are then welded together to form a stadium shaped or elliptical loop.

The perimeter 11 of the T-shaped blank 1 is spaced inwardly of the outer edges 10 of the steel strip 2. All of the material 12 surrounding the blank 1, as represented by the hatched lines in FIG. 1, is removed and scrapped. This process, therefore, results in significant wastage. Furthermore, the T-shape of the strap blank 1 hinders the ability to apply a finish to the edges of the strap due to interference with the head section. This means that any sharp edges or 'burrs' caused by the press tooling cannot be effectively removed.

It is therefore desirable to provide an improved method of forming a termination band which addresses the above-described problems and/or which offers improvements generally.

SUMMARY

According to the present disclosure, there is provided a method of manufacturing a termination band as described in the accompanying claims.

In an aspect of the invention there is provided a method of manufacturing a termination band comprising:
a) forming a strap by cutting a first length of material from a preformed strip material having a width corresponding to the width of the strap;
b) forming a head by:
 i. cutting a second length of material from a preformed strip material having a width corresponding to the width of the head to form an elongate blank having opposed free ends; and
 ii. bending the opposed free ends of the second length of material inwardly towards each other to form at least the side walls of a loop;
c) bringing at least one edge of the strap into abutment with at least one edge of the head to define at least one join line; and
d) welding the at least one join line while the strap is held in abutment with the head to secure the strap to the head, the strap and the head being configured and arranged such that when so secured the head comprises an upper wall, lower wall and opposed side walls formed as a loop with the strap extending therefrom.

The termination band is therefore formed as a two-piece component, rather than from a single piece blank as in the prior art. Advantageously this enables the strap and the head to be formed from stainless steel strip having the same width as the head and the strap. It is therefore not necessary to trim the material of either part and hence there is significantly reduced material wastage when forming the termination band. In addition, because the strap and head are both initially in the form of straight-sided elongate strips prior to the folding or joining operations, both parts may be easily edge finished and/or surface finished.

In a further advantage, forming the band from two separate components allows the strap to be joined to the head at an angle. In one embodiment the strap and the lower wall of the head are arranged such that they are co-planar and in line. In another embodiment, the strap may be placed in abutment with the head such that the angle between the strap and the lower wall, and in particular the angle between the lower surface of the strap and the outer surface of the lower wall is less than 180 degrees. This is achieved by holding the strap in abutment with the head at the desired angle while the second join line is welded. By welding the strap at an angle to the head, the band is able to more closely conform to the curved surface of the shield and the underlying backstop when fitted in use.

The strap and head are preferably formed of metal and preferably are formed of stainless steel.

The step of welding the first and second join lines preferably comprises laser welding. Advantageously this provides a very high strength weld while minimizing the weld profile and ensuring the band is able to sit flush with the surface of the shield. It also enables the two join lines to be welded with a high degree of accuracy and in a very repeatable manner.

The strap may have a length L1 and a width W1, and the head has a length L2 and a width W2, and the width W1 of the strap is equal to the width W2 of the head. This enables the strap and head to be formed from the same strip metal with no trimming required.

The opposed free ends of the second length of material may be bent inwardly towards each other such that a gap is defined between the opposed free ends that is equal to the width of the strap, and the strap is located within the gap such that the side edges of the strap are brought into engagement with the free ends to define first and second join lines extending longitudinally in relation to the length of the strap. The first and second join lines are welded while the side edges of the strap are held in abutment with the free ends of the head, and when the strap is secured to the head the portion of the strap located within the gap defines at least part of the lower wall of the head.

The strap preferably extends from a first side of the of the head and includes an upper surface that faces outwardly away from the surface to which the termination band is secured in use, and the termination band further includes a tab or tang extending from a second side of the head that slopes downwardly away from the head to form a ramped element for supporting a portion of the strap in use.

A method preferably comprises the step of bending an end section of the strap to form the ramped element.

The side walls of the head are curved, and the upper and lower walls are straight, such that the head has a stadium shape. This enables the head to be formed with a series of simple folding operations. The term stadium shaped means a looped, substantially elliptical shape, which preferably has straight sides and curved ends.

A welding device may be used to weld the first and second join lines and preferably during the step of welding the first and second join lines the lower surface of the strap and the outer surface of the head are oriented towards the welding device.

The welding device is preferably a laser welder and during the step of welding the first and second join lines, the lower surface of the strap, and the outer surface of the head are oriented towards the laser, meaning the laser may be directed at the join lines.

The head is preferably introduced into a rotary tool configured to locate and support the head in a fixed position relative to the tool. The rotary tool has a rotational axis and a radial axis, and the head is held on the rotary tool such that the outer surface of the lower wall faces radially outwards. This enables the laser to be positioned adjacent the rotary tool with the beam directed radially at the head.

The head is preferably introduced to the rotary tool when the rotary tool is in a first rotary position, and the method further comprises moving the rotary tool to a second rotary position, and moving the strap into abutment with the head and welding the first and second join lines while the rotary tool is in the second rotary position. While the head is moved to the second position further heads may be supplied to the rotary tool in subsequent index positions, enabling bands to be formed in a rapid, controlled and repeatable fashion.

In another aspect of the invention there is provided a method of manufacturing a termination band comprising forming a strap by cutting a first length of material from a preformed strip of material having a width corresponding to the required width of the strap. The method also comprises forming a head by firstly cutting a second length of material from a preformed strip material having a width corresponding to the width of the head to form an elongate blank having opposed free ends; and then forming the second length of material into a loop such that the free ends are brought into engagement with each other to define a first join line, the head having an upper wall, lower wall and opposed side walls when formed as a loop with the first join line being located along the lower wall. The end of the strap is then brought into abutment with a side edge of the lower wall of the head to define a second join line. The first and second joinlines are then welded while the strap is held in abutment with the head.

Preferably, when the strap is in abutment with the head the length of the head is perpendicular to the length of the strap. Furthermore, the first and second join lines are arranged perpendicular and immediately adjacent to each other. As the join lines are adjacent, they are able to be welded in a single welding operation, rather than requiring the parts to be rotated between welding operations, thereby simplifying the manufacturing process.

The lower wall preferably has an outer surface that faces outwardly in use and an inner surface that faces the upper wall, the strap has an upper and lower surface, and the strap is brought into abutment with the head such that the lower surface of the strap is aligned and contiguous with the outer surface of the head.

In another aspect of the invention there is provided a termination band comprising an elongate strap having a first end and second end. A head comprises an upper wall and opposing first and second side walls each having a first end adjacent the upper wall and an opposing second end, the second ends being spaced from each other. A portion of the elongate strap is located between the spaced second ends of the first and second side walls and is welded in abutment with the second ends of the first and second side walls along first and second join lines arranged longitudinally in relation to the length of the strap, and wherein the end second weld line that adjoins and is perpendicular to the first weld line. The lower wall comprises a first lower wall section extending from the first side wall and a second lower wall section extending from the second side wall, the first and second lower wall sections being welded together along a first weld line to form the loop. The portion of elongate strap located between the second ends of the first and second side walls forms a lower wall of the head, such that the head is formed as a loop.

DRAWINGS

The invention will now be described by way of example only with reference to the following illustrative figures in which.

Figure 6:
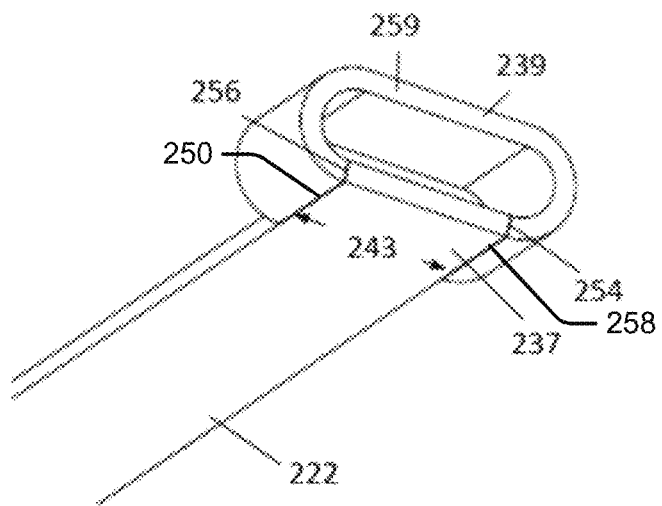
Figure 7:
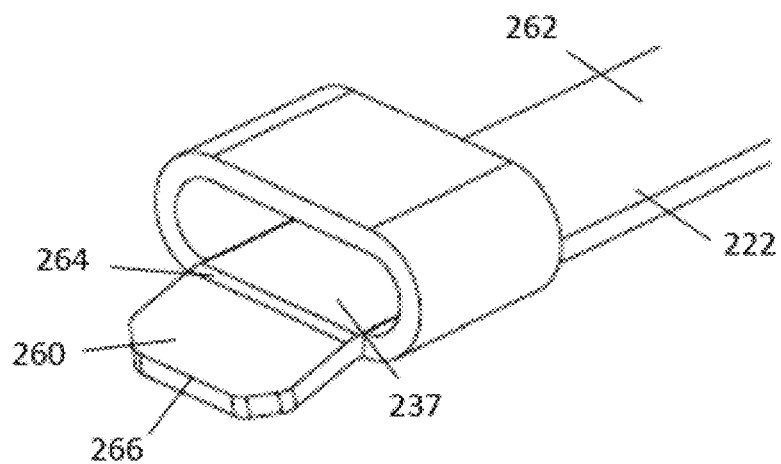

FIG. 6 the head and partial view of a strap of another termination band according to the present disclosure; and FIG. 7 shows a strap including a tang according to the present disclosure.

DESCRIPTION OF EMBODIMENTS

Figure 1:
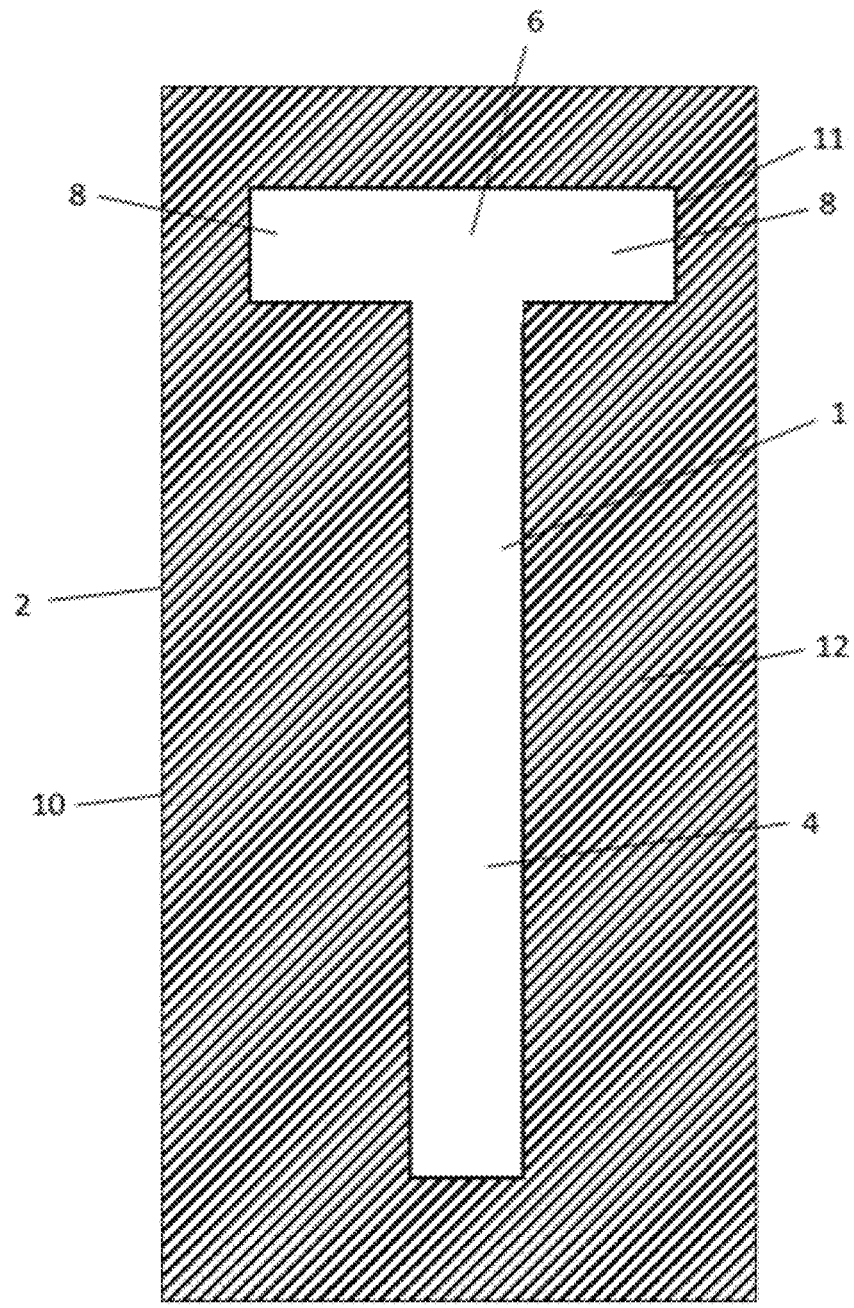
FIG. 1 shows a blank termination band of the prior art punched in a sheet.
Figure 2:
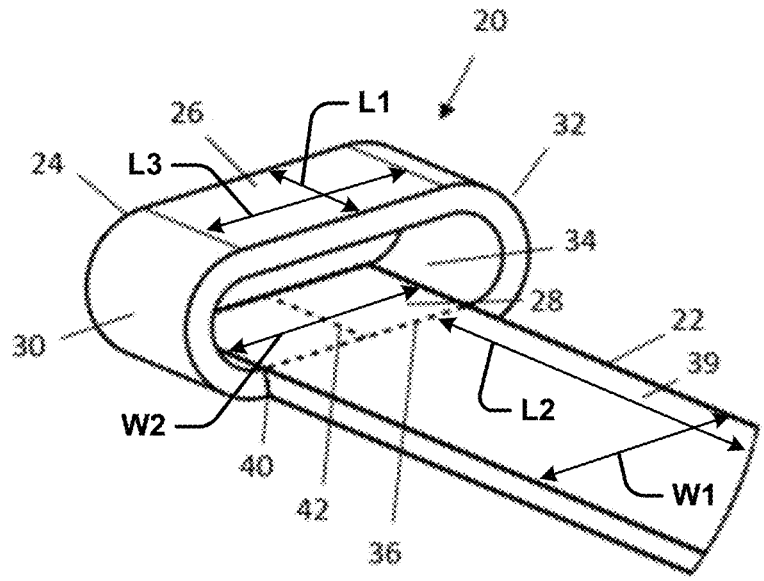
FIG. 2 shows the head and partial view of a strap of a termination band according to the present disclosure.

Referring to FIG. 2, a termination band 20 comprises a flat, elongate strap 22 and a head 24. The head 24 has substantially a stadium shape, with opposing upper and lower walls 26,28 that are straight, and semi-circular end walls 30,32, which combine to form a loop having an aperture 34 defined within. It will, however, be appreciated that other looped shapes may be utilised, including but not limited to rectangular, square or oval forms. The head 24 is located at a first end 36 of the strap 22, which also has an opposing free end. The head 24 has an outer surface 25. The first end 36 of the strap 22 is connected to an outer side edge 40 of the lower wall 28 of the head 24. The head 24 is arranged such that the length L1 of the head 24 extends transversely to length L2 of the strap 22 and parallel to the width W1 of the strap 22. The length L3 of the upper 26 and lower 28 walls of the head 24 is equal to the width W1 of the strap 22. The lower wall 28 therefore forms a continuation of the strap 22. The upper wall 26 is vertically spaced from the lower wall 28 and from the strap 22. The width W2 of the head 24 is also equal to the width W1 of the strap 22. The semi-circular end sections 30,32 extend outwardly width-wise past the side edges 42 of the strap 22 such that the termination band 20 is a substantially T-shaped when viewed from above.

The strap 22 has an upper surface 39 which in use faces radially outwards, and a lower surface 41 which in use is inwardly facing and in contact with the shield. During installation the strap 22 is formed into a loop and the free end of the strap 22 is inserted through the aperture 34 of the head 24. The strap 22 is then tensioned, cropped in length and bent in a similar manner to the above-described process of the prior art. This process, and the equipment for performing these operations are well known in the prior art.

The termination band 20 is manufactured from a stock of rolled stainless steel strip. The stainless-steel strip is selected having a width corresponding to the desired width W1 of the strap 22 and W2 of the head 24. This is preferable as it enables the same stock material to be used to form the head 24 and the strap 22. In other embodiments, the head 24 and strap 22 may have different widths. In a first operation, the strap 22 is formed by cutting a length of the steel strip corresponding to the desired length L1 of the strap 22. As the steel strip is pre-formed to the required width and the strap 22 is cut directly from the roll rather than being pressed from sheet steel, the strap 22 may be cut to any desired length, and the strap length may be selectively varied from strap to strap.

When cut to length the strap 22 may then be edge treated to remove any burs and/or to apply a radius or other finish to the edge. The strap 22 may also be surface treated to achieve a desirable finish. Edge treatment and surface finishing of the strap 22 is easily achieved as the strap 22 is straight-sided and does not include a projecting head to interfere with any finishing tool, in contrast to the T-shaped blanks of the prior art.

In a second operation, the head is formed from a second stock of rolled stainless steel strip, which is the same as the stock of rolled stainless steel strip from which the strap 22 is formed. A straight length steel strip is cut by conventional means to a length corresponding in length to the perimeter P of the head 24. The straight length of steel strip is then formed in a bending operation in which the free ends 42 are bent back on themselves and to create the two semi-circular end walls 30,32. Any suitable bending operation for strip steel and tool for the same may be selected from those well-known and understood by persons skilled in the art. The free ends 42 continue to be bent until their distal edges are in contact, forming the lower wall 28. At this stage, the stadium shape of the head 24 is fully formed.

Figure 3:
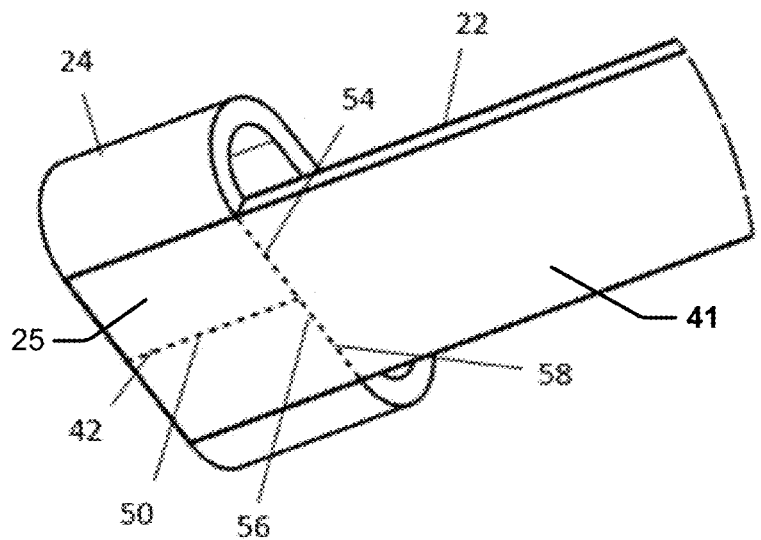
FIG. 3 is a view from below of the termination band of FIG. 2.

As shown in FIG. 3, the interface between the two free ends 42 defines a first join line 50. The first join line 50 is located centrally along the length of the lower wall 28 and extends transversely to the length of the lower wall 28. At this stage, the free ends 42 are in contact or immediately adjacent to each other but are not joined. The head forming operation may be performed before, simultaneously with or after the strap forming operation.

In a third operation, the formed heads 24 are placed in a bowl feeder which orients the heads 24 and presents them to a rotary tool, commonly referred to as a welding nest, that is used to locate and support the heads 24. Each head 24 is introduced to the rotary tool when the tool is at a first rotary position. The head 24 is retained on the rotary tool within a recess corresponding to the peripheral stadium shape of the head 24. The head 24 is positioned on the rotary tool such that the lower wall 28 and the join line 50 thereon are facing radially outwards, and such that a first side edge 54 of the lower wall 28 of the head 24 is facing outwardly in an axial direction relative to the rotary tool, with the opposing side edge facing inwardly and being supported on a backstop. The rotary tool includes a series of openings in its radially outer wall corresponding to the locations of the series of recesses for receiving the heads 24, the openings being configured such that the first and second join lines 50,58 are fully visible in when viewed in the radial direction.

The heads 24 are held and supported in the recesses in a fixed position relative to the tool. The tool is indexed to a second rotary position corresponding to the welding station. At the welding station, the strap 22 is moved axially into abutment with the head 24. Specifically, the end face 56 of the strap 22 is brought into abutment and alignment with the side edge 54 of the lower wall 28, which is axially exposed when supported on the rotary tool. The interface between the strap 22 and the lower wall 28 defines a second line 58 that is perpendicular to the first join line 50. The second join line 58 abuts the first join line 50 forming a T-shaped arrangement. A laser welder is then operated to create a laser weld along the first join line 50 and the second join line 58. Any suitable laser welder may be used and may comprise by way of example a solid state or gas laser. It will however be appreciated that other welding techniques may also be used. The band 20 is thus formed as a two-piece construction formed of the head 24 and the strap 22. The laser is able to weld both join lines 50,58 in a single operation due both join lines being located at a common, outwardly facing position at the lower surface of the strap 22, in contrast to the prior art in which the join line of the head is located on the upper wall, and spaced away from the strap.

Figure 4:
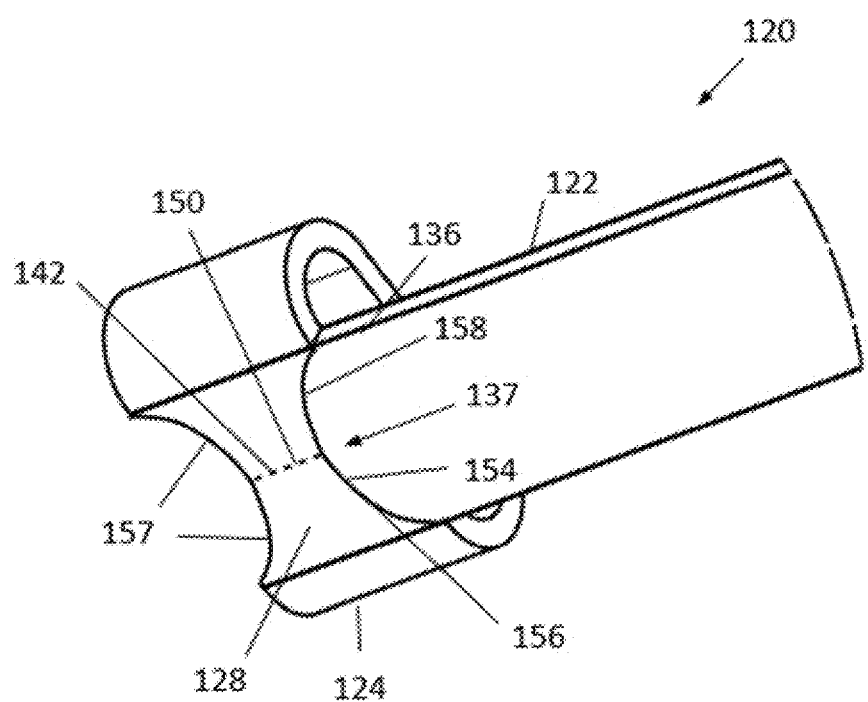
FIG. 4 shows the head and partial view of a strap of a further termination band according to the present disclosure.

In a further embodiment, as shown in FIG. 4, the termination band 120 comprises a flat, elongate strap 122 and a head 124. A first end 136 of the strap 122 is formed having a convex, semi-circular profile end section 137. The outer edge of the convex, semi-circular section 137 defines the end face 156 of the strap 122. The head 124 includes a lower wall 128, which comprises a semi-circular concave cutaway extending inwardly from its outer edge that define a side edge 154 of the lower wall 128. The concave shape of the cutaway corresponds to the shape of the convex end section 137 of the strap 122. The head 124 includes a second concave cutaway section having the same shape and size as the first cutaway, located at the opposing side of the lower wall 128 that defines the second side edge 155 of the lower wall 128.

During the first cutting operation, the convex profile of the end section 137 of the strap 122 is formed simultaneously with the strap 122 being cut to length. In a second operation, scalloped sections 157 are cut from the end corners of a second length of the steel strip at the same time the second length is cut to the required length. The head 24 is then bent and formed in the same manner as the first embodiment described above. When the head 124 is formed and the free ends 142 are brought together, the scalloped sections 157 align to create the semi-circular cutaway. A semi-circular cutaway is formed on each side of the head 124. As a result, it is not necessary to align the head 124 in a single specific orientation as it is able to present a semi-circular cutaway to the semi-circular end section 137 of the strap 122 at both sides.

The formed heads 124 are placed in a bowl feeder which orients the heads 124 and presents them to a rotary tool for welding the join line 150 facing radially outwards as described above. The convex curved end face 156 of the strap 122 is moved axially into abutment with the concave curved side edge 154 of the head 124 to define a second join line 158. A laser welder is then operated to create a laser weld along the first join line 150 and the second join line 158. The curved profile of the weld along the second join line 158 advantageously resists creasing as the strap 122 is bent around a curved surface, thereby reducing the stresses on the weld line.

Figure 5:
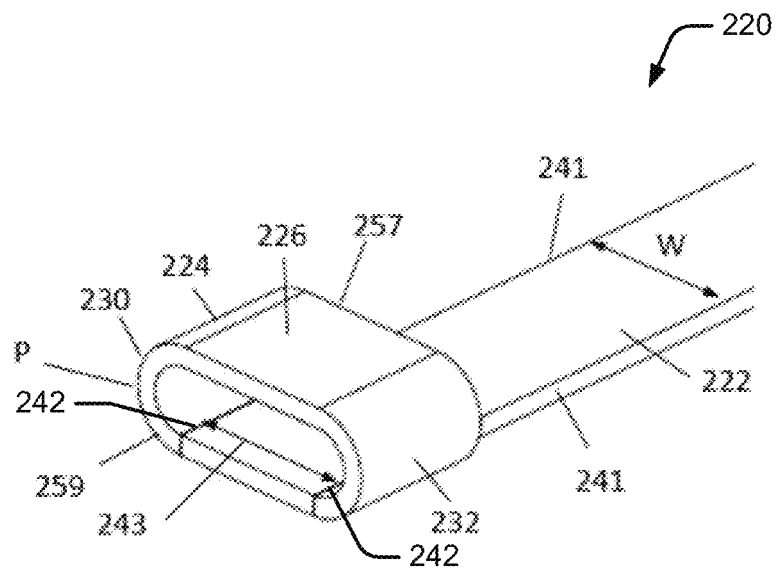
FIG. 5 is a view from below of the strap termination band of FIG. 4.

In another embodiment, as shown in FIG. 5, the head 224 is formed from a straight length steel strip having a length that is equal to the length to the perimeter P of the head 224 minus the width W of the strap 222. The head 224 is formed in a bending operation in which the free ends 242 are bent back on themselves to create two semi-circular end walls 230,232 interconnected by an upper wall 226 having a width substantially equal to the width W of the strap 222. The two semi-circular end walls 230,232 are formed such that the free ends 242 are located at the ends of the semi-circular end walls 230,232, and such that the free ends 242 are spaced by a gap 243 having a width equal to the width W of the strap 222. At this stage the head 124 has a substantially C shaped form with a straight upper wall 226 and curved end walls 230,232. The exposed faces of the free ends 242 define a first end face 254 and a second end face 256. The head includes an inner side edge 257 and an outer side edge 259.

During the welding stage, which is similar to the above described process, an end section 237 of the strap 222 is inserted into the gap 243 between the free ends 242 of the head 224. The end section 237 includes an end face 239. The end section 237 of the strap 222 is located within the gap 243 such that the end face 239 of the strap 222 is aligned with the outer side edge 259 of the head 224. In this position the end section 237 spans the gap 243 and completes the substantially stadium shape of the head 224, with the side edges 241 of the strap 222 aligned and in engagement with the first end face 254 and a second end face 256 of the head 224, as shown in FIG. 6. The lines of engagement between the side edges 241 and the first end face 254 and the second end face 256 define a first join line 250 and a second join line 258 respectively.

A laser welder is operated in the same manner as described above to create a laser weld along the first join line 250 and the second join line 258. The welds along the first join line 150 and the second join line 158 are aligned with and extend parallel to the length of the strap 222 and transverse to the length of the head 224. During application of the termination band 220, any stress forces during tightening of the band are experienced along the weld lines rather than transverse to the weld lines, and as such do not act to pull the welded surfaces apart. In addition, any bending occurs gradually along the length of the weld lines rather than the weld acting as a hinge point. Furthermore, in this embodiment the strap 222 is secured to the head by two weld lines rather than a single weld line. In this way the forces on the weld are significantly reduced, and the strap 222 is better secured to the head 224, thereby mitigating the risk of failure.

In another embodiment, as shown in FIG. 7, the strap 222 may include a tang 260 extending from the end section 237 past the outer side edge 259 of the head 224. The strap 222 includes an upper surface 262 and the tang 260 slopes downwardly from upper surface 262. The tang 260 comprises a tab portion of the strap 222 extending past the end section 237. The tang 260 may be formed by bending the strap 222 along a bend line 264 transverse to its length. Alternatively, or in addition, the tang 260 may be pressed or otherwise formed such that it tapers towards its free end 266. In use the tang 260 creates a ramped surface to bridge the gap between the upper surface 262 of the strap 222 at the outer end of the head 224 and the surface to which the termination band is applied, thereby limiting point bending forces on the strap and providing a smoother transition for the free end of the strap 222 as it is inserted into the head 224.

What is claimed is:

1. A method of manufacturing a termination band comprising:
   a) forming a strap by cutting a first length of material from a preformed strip material having a width corresponding to the width of the strap;
   b) forming a head by:
      i) cutting a second length of material from a preformed strip material having a width corresponding to the width of the head to form an elongate blank having opposed free ends; and
      ii) bending the opposed free ends of the second length of material inwardly towards each other to form at least the side walls of a loop;
   c) bringing at least one edge of the strap into abutment with at least one edge of the head to define at least one join line; and
   d) welding the at least one join line while the strap is held in abutment with the head to secure the strap to the head, the strap and the head being configured and arranged such that when so secured the head comprises an upper wall, lower wall and opposed side walls formed as a loop with the strap extending therefrom.

2. The method according to claim 1, wherein the strap and head are formed of metal.

3. The method according to claim 1, wherein welding the at least one join line comprises laser welding the at least one join line.

4. The method according to claim 1, wherein the strap has a length and a width Win and the head has a length and a width, and the width of the strap is the same as the width of the head.

5. The method according to claim 4, wherein the head and the strap are both formed from the same preformed strip material.

6. The method according to claim 1, wherein the side walls of the head are curved and the upper and lower walls are straight, wherein the head has a stadium shape.

7. The method according to claim 1,
wherein the opposed free ends of the second length of material are bent inwardly towards each other such that a gap is defined between the opposed free ends that is equal to the width of the strap, and the strap is located within the gap such that the side edges of the strap are brought into engagement with the free ends to define first and second join lines extending longitudinally in relation to the length of the strap, and wherein the first and second join lines are welded while the side edges of the strap are held in abutment with the free ends of the head, and wherein when the strap is secured to the head the portion of the strap located within the gap defines at least part of the lower wall of the head.

8. The method according to claim 7, wherein the strap extends from a first side of the of the head and includes an upper surface that faces outwardly away from the surface to which the termination band is secured in use, and the termination band further includes a tab extending from a second side of the head that slopes downwardly away from the head to form a ramped element for supporting a portion of the strap in use.

9. The method according to claim 8, further comprising bending an end section of the strap to form the ramped element.

10. The method according to claim 1,
wherein bending the free ends of the second length of material comprises bending the second length of material into a loop having an upper wall, lower wall and opposed side walls with the free ends in engagement with each other to define a first join line located along the lower wall; and wherein the strap is brought into abutment with a side edge of the lower wall of the head to define a second join line, the first and second join lines being welded while the strap is held in abutment with the head.

11. The method according to claim 10, wherein when the strap is in abutment with the head the length of the head is perpendicular to the length of the strap.

12. The method according to claim 10, wherein the first and second join lines are arranged perpendicular to each other.

13. The method according to claim 10,
wherein the lower wall has an outer surface and an inner surface that faces the upper wall, and the strap has an upper and lower surface, and wherein the strap is brought into abutment with the head such that the lower surface of the strap is contiguous with the outer surface of the head.

* * * * *